United States Patent [19]

Keyes et al.

[11] Patent Number: 5,279,125
[45] Date of Patent: Jan. 18, 1994

[54] MASTER CYLINDER WITH CAGING MEANS TO SECURE RETURN SPRING LIMITING STUD

[75] Inventors: Hugh E. Keyes, South Bend; Robert K. Wilson; Donald A. Crumb, both of Granger, all of Ind.

[73] Assignee: Allied-Signal Inc., Morristown, N.J.

[21] Appl. No.: 986,813

[22] Filed: Dec. 8, 1992

[51] Int. Cl.$^5$ .................. B60T 11/20; B60T 17/16
[52] U.S. Cl. .......................... 60/562; 60/568
[58] Field of Search .............. 60/562, 568, 589; 188/345

[56] References Cited

U.S. PATENT DOCUMENTS

| | | | |
|---|---|---|---|
| 4,939,901 | 7/1990 | Saalbach et al. | 60/562 |
| 5,161,375 | 11/1992 | Crumb et al. | 60/562 |
| 5,179,834 | 1/1993 | Rauschenbach | 60/562 X |
| 5,207,062 | 5/1993 | Wilson et al. | 60/562 |
| 5,214,917 | 6/1993 | Crumb et al. | 60/562 |

Primary Examiner—Richard A. Bertsch
Assistant Examiner—John Ryznic
Attorney, Agent, or Firm—Leo H. McCormick, Jr.; Ken C. Decker

[57] ABSTRACT

Structure for caging a return spring of a master cylinder to define limits for an operational chamber. The structure includes a first cylindrical member which engages a first piston and a second cylindrical member which engages a second piston with the return spring being located between the first and second cylindrical members. A stud which has an irregular shaped end member is retained in a groove in the second piston by the second cylindrical member and mated with a head member to define the limits for the return spring between the first and second cylindrical members and correspondingly the maximum size of the chamber within a bore of a master cylinder.

8 Claims, 2 Drawing Sheets

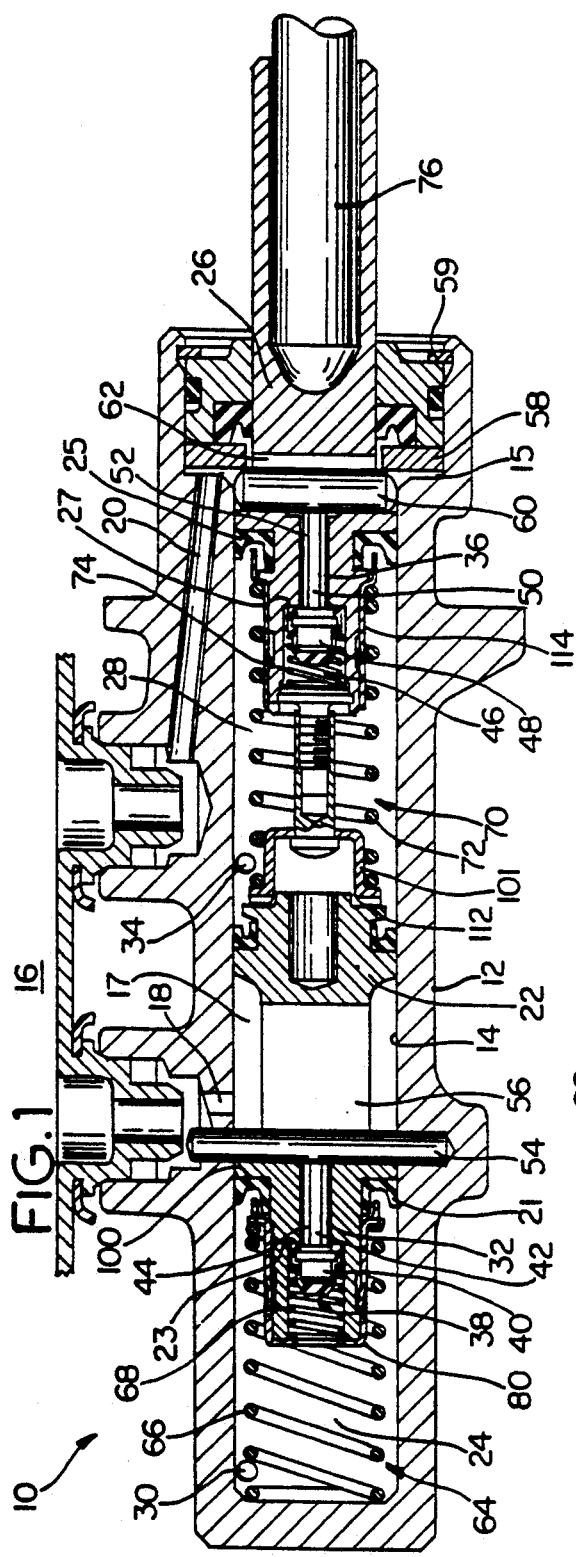
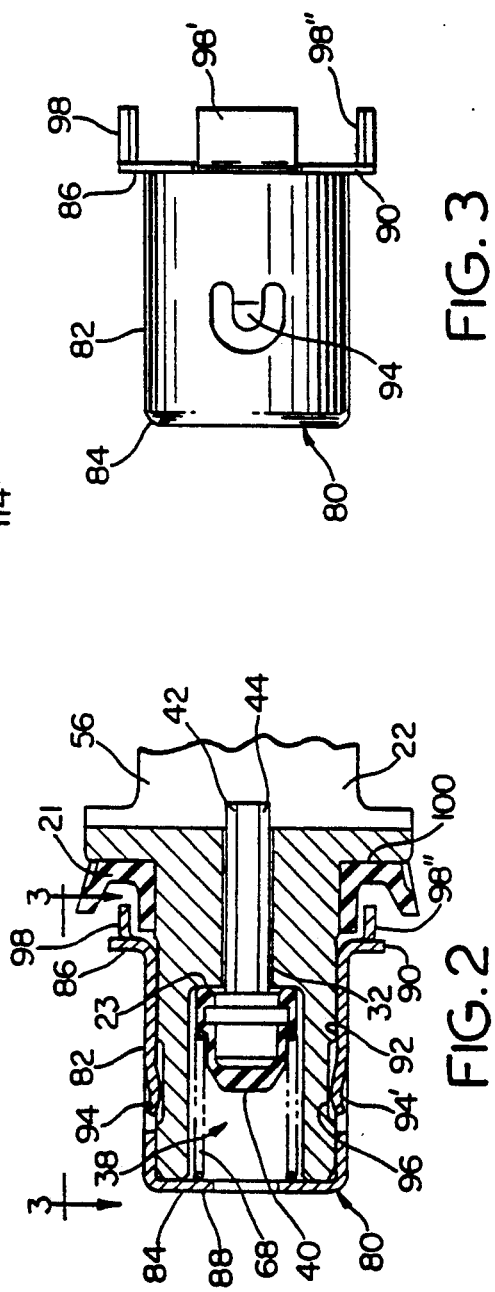

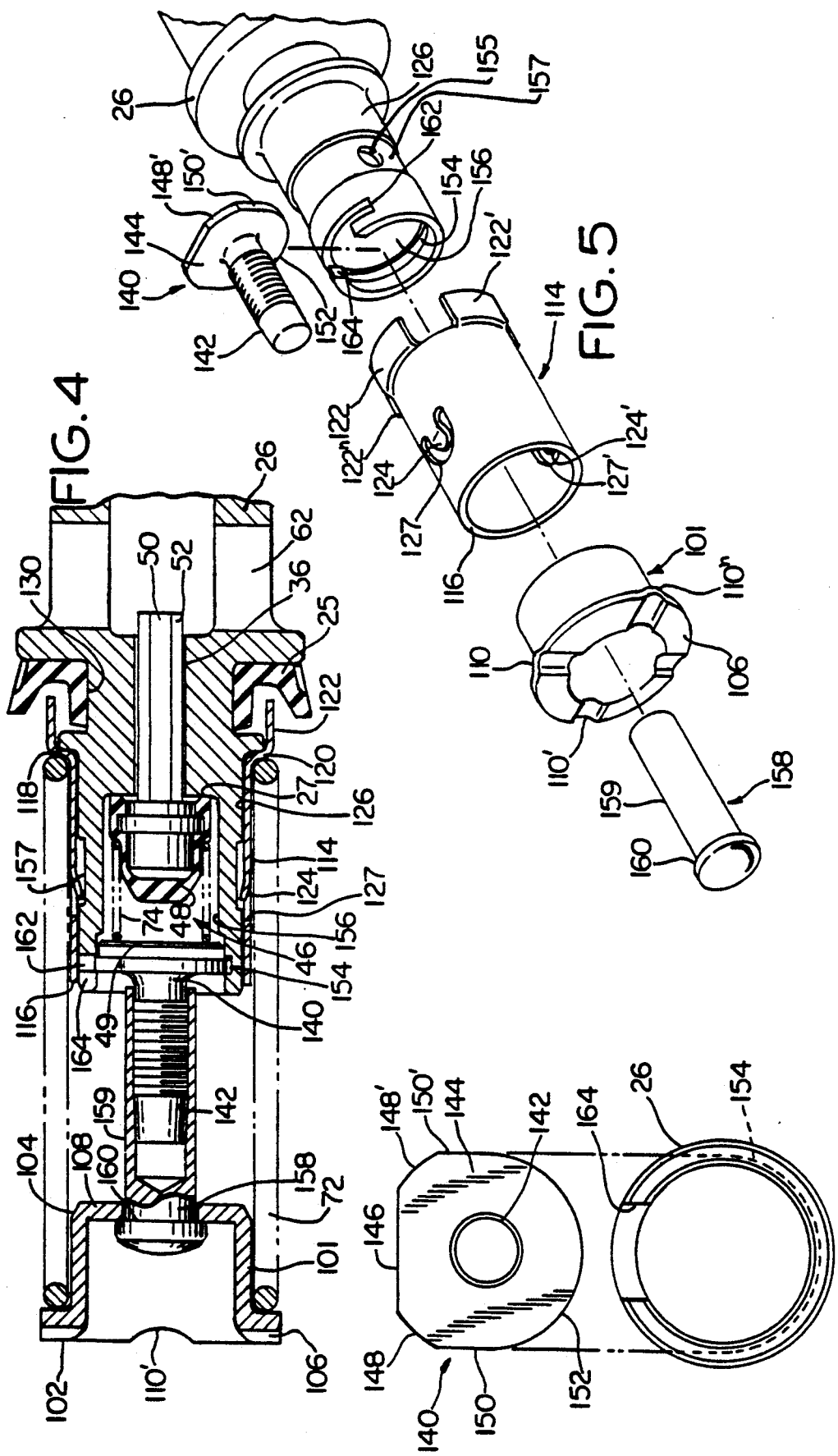

MASTER CYLINDER WITH CAGING MEANS TO SECURE RETURN SPRING LIMITING STUD

This invention relates to a center port compensating master cylinder wherein a caging arrangement for a piston return spring and compensation valve return spring is fixed to a piston of the master cylinder.

In an effort to improve the operational characteristics of a master cylinder, it has been disclosed in U.S. Pat. Nos. 4,550,567 and 4,939,901 that compensation between a reservoir and the pressurization chambers can effectively occur through center ports in operational pistons. A variety of caging arrangements such as disclosed in U.S. Pat. No. 5,161,375 and application Ser. No. 920,965, now U.S. Pat. No. 5,207,063, issued May 4, 1993, have been developed for retaining return springs and valve springs in the bore of such master cylinders. These caging arrangements function in a satisfactory manner when installed in a master cylinder however it has been determined that a more positive connection is desirable between the return spring and an operational piston.

In the present invention we have developed a caging arrangement for securing a return spring to an operational piston of a master cylinder of a brake system. The master cylinder has a housing with a bore therein connected to a reservoir through first and second ports in first and second pistons located in the bore. The first piston has a first passageway therein for connecting the reservoir to the first chamber while the second piston has a second passageway therein for connecting the reservoir to the second chamber. A first valve located in the first passageway controls fluid communication between the reservoir and the first chamber while a second valve located in the second passageway controls fluid communication between the reservoir and the second chamber. A first return spring urges the first piston away from the bottom of the bore to a first chamber within the bore. A stud has an end member with an irregular surface retained in a first groove in the second passageway of the second piston. A first cylindrical member engages the first piston while a second cylindrical member is connected to the second piston through a plurality of tabs that engage snap into a second groove on the peripheral surface of the second piston. In addition, the second cylindrical member engages the end member to hold the stud in substantially the center of the bore. A second spring is located in the bore between the first and second cylindrical members. When a head member retained by the first cylindrical member is mated with the stud, the second spring is compressed to establish the distance between the first and second cylindrical members and correspondingly the maximum size of the second chamber within the bore. When an input force is applied to move the second piston, the second spring also moves the first piston to allow the first and second valves to simultaneous interrupt communication through the first and second passageways. Thereafter, further movement of the pistons by the input force pressurizes fluid in the first and second chambers to effect a brake application.

It is an object of this invention to provide a master cylinder with a caging arrangement attached to a piston for retaining a return spring within a bore of a housing.

It is a further object of this invention to provide a caging arrangement for a return spring which is secured to a piston by a stud retained in a groove by a cylindrical member.

An advantage provided by this invention resides in the subassembly of a portion of a caging arrangement with a piston whereby various strength return springs which can be matched with the piston as a function of a desired operational characteristic of the master cylinder.

These advantages and objects should be apparent from reading this specification while viewing the drawings wherein:

FIG. 1 is a cross sectional view of a schematic illustration of a master cylinder wherein the return springs for the pistons and compensation valves are caged in the bore in accordance with the principals of this invention;

FIG. 2 is an enlarged view of a cylindrical member shown in FIG. 1 for caging a first compensation valve;

FIG. 3 is a view of the cylindrical member of FIG. 2 taken along lines 3—3 of FIG. 2;

FIG. 4 is an enlarged view of the caging arrangement for the return spring and second compensating valve of FIG. 1;

FIG. 5 is an isometric exploded view of the caging arrangement of FIG. 4; and

FIG. 6 is an end view of the piston of FIG. 5 showing the groove for retaining the end member of the stud.

The master cylinder 10 for a brake system as shown in FIG. 1 has a housing 12 with a bore 14 connected to a reservoir 16 through first 18 and second 20 ports. A first piston 22 is located in bore 14 to define a first pressure chamber 24 and a second piston 26 is located in bore 14 to define a second pressure chamber 28 in housing 12. The first pressure chamber 24 is connected to a brake system through outlet port 30 and to reservoir 16 through a passageway 32 in the first piston 22. The second pressure chamber 28 is connected to the brake system through an outlet port 34 and to the reservoir 16 through a second passageway 36 in the second piston 26. A first valve 38 located in the first piston 22 has head 40 with a stem 42 attached thereto. Stem 42, which is located in passageway 32, has ribs 44 thereon to provide a flow path between a portion 17 of bore 14 connected to reservoir 16 and chamber 24. A second valve 46 located in the second piston 25 has head 48 with a stem 50 attached thereto. Stem 50, which is located in passageway 36, has ribs 52 thereon to provide a flow path between portion 15 of bore 14 and chamber 28. A first pin 54 attached to housing 12 and extending through a slot 56 in piston 22 forms a stop for limiting the movement of the first piston 22 within bore 14. A second pin 60 retained in the bore 14 by bearing seal assembly 58 is located in a slot 62 in piston 26 to form a stop for limiting the movement of the second piston 26 within bore 14.

First resilient means 64 is located in the bottom of bore 15 to urge the first piston 22 and head 40, respectively, toward the first pin 54. When piston 22 engages pin 54 as shown in FIG. 1, stem 42 engages pin 54 to position head 40 away from face seat 23 and allow communication of fluid from reservoir 16 into chamber 24 through the flowpath in the first passageway 32. Similarly, second resilient means 70 which includes return springs 72 and 74 urge the second piston 26 and head 46 toward the second pin 60. When piston 26 engages pin 60 as shown in FIG. 1, stem 50 engages pin 60 to position head 48 away from face seat 27 and allow communication of fluid from reservoir 16 into chamber 28 through the flowpath in the second passageway 36. In response to an actuation force from an operator, input member 76 connected to the second piston 26 simultaneously moves the second piston 26 and first piston 22 by way of return spring 72 in bore 14. At the same time valve return springs 74 and 68, respectively move heads 48 and 40 associated with valves 46 and 38 into correspondingly engagement with face seats 27 and 23, to interrupt fluid communication through the flowpath of the second 36 and first 32 passageways. Thereafter, further movement of the second 26 and first 22 pistons in bore 14 pressurizes fluid in the second 28 and first 22 chambers. Thus master cylinder 10 center port compensation valve 38 and 40 function in an adequate manner to prevent damage to the lip seals 21 and 25 located on pistons 22 and 26, respectively, during a brake application.

In more particular detail, the caging structure for the first 64 and second 70 resilient means includes several components which should simplify the construction of the master cylinder 10.

The retainer 80 of the caging structure for the first resilient means 64 is shown in FIGS. 2 and 3. Retainer 80 has a cylindrical body 82 with a first end 84 and a second end 86. The first end 84 has an inwardly projecting flange 88 while the second end 86 has an outwardly projecting flange 90. The cylindrical body 82 which is concentric with peripheral surface 92 on piston 22 has a plurality of tabs 94, 94' which snap into groove 96 on surface 92. Flange 90 has a plurality of axial projections 98, 98'...98$_n$ which are adapted to retain seal 21 adjacent face 100 on piston 22. Valve return spring 68 which engages the inwardly projecting flange 88 urges head 40 toward face 23 to control the flow communication through passageway 32. When retainer 80 is located on piston 22 and inserted into bore 14, return spring 66 engages flange 90 to transmit a return force through retainer 80 into piston 22 by way of the inwardly projecting flange 88.

The caging arrangement for resilient means 70 is shown in FIG. 4, 5 and 6 and includes a first cylindrical member 101, a second cylindrical member 114, a stud 140 and a head 158. The first cylindrical member 101 has a first end 102 and a second end 104. The first end 102 has an outwardly projecting flange 106 while the second end 104 has an inwardly projecting flange 108. A plurality of set-off members 110, 110'...110$_n$, which are located on the first end 102, engage a face 112 on piston 22. The set-off members 110, 110'...110$_n$ are designed to allow the free flow of fluid between the interior of cylindrical member 101 and chamber 28. The second cylindrical member or body 114 has a first end 116 and a second end 118. The second end 118 has an outwardly projecting flange 120 with a plurality of axial projections 122, 122'...122$_n$ extending therefrom which help retain seal 25 in groove 130 on peripheral surface 126 on piston 26. The cylindrical member 114 has a plurality of U-shaped openings 127, 127' located adjacent the first end 116 to create tabs 124, 124' to retain the cylindric member 114 on peripheral surface 126. Return spring 72 is located between flanges 106 and 120 to define the size of chamber 28. The stud 140 as best shown in FIGS. 5 and 6 has a threaded stem 142 attached to an end member 144. The end member 144 has an irregular shape with a base 146, arcuate segment 148, 148', parallel side sections 150, 150' that are tangent with a semi-circle 152. The diameter of the semi-circle is approximately the same radius as interior groove 154 in bore 156 of piston 26 while the arcuate segment 148, 148' have a radius that approximates the peripheral surface 126 of piston 26. The head member 158 has a cylindrical body 159 that extends from a shoulder 160.

The cylindrical body 114 is joined with piston 26 in the following manner. Stem 50 of valve 46 is inserted into passageway 36 with spring 74 attached to head 48. Spring 74 is compressed as star washer 49 is inserted into bore 156 of piston 26 to retain valve 46 in bore 156. Thereafter, end member 144 is inserted into slot 162 associated with groove 154. Stud 140 is vertically moved through slot 162 until stem 142 is in approximate axial alignment with the center of piston 26. The end member 144 forms the base for caging spring 74 of valve 46 within passageway 36. Cylindrical body 114 is pushed onto peripheral surface 126 of piston 26 and engages arcuate segment 148, 148' on end member 144 to hold the stud 140 in groove 154 in a manner to prevent rattling and to assure that stem 142 remains in the axial center of piston 26. As cylindrical body 114 moves onto peripheral surface 126, tabs 124, 124' snap into groove 157 and under some circumstances tabs 124, 124' may need to be crimped to assure that they do not come out of groove 157. Spring 72 is placed on cylindrical member 144 and compressed after cylindrical member 101 is placed on the end of spring 72. Cylindrical body 159 of head member 158 passes through the opening formed by the inwardly projecting flange 108 and is mated with threads on stem 142 and a torque applied through a drive key to move head member 158 toward end member 144 on stud 140 to establish the maximum limits for spring 72. Thereafter, piston 26 is inserted in bore 14 and snap ring 59 of bearing seal assembly 58 attached to housing 12 to complete the installation of pistons 22 and 26 in housing 12.

In operation, an input applied by input member 76 simultaneously moves piston 26 and 22 through spring 72 as spring 66 is compressed. Movement of pistons 26 and 22 with respect to stops 60 and 54 allow valve return springs 74 and 68 to independently move heads 48 and 40 toward seats 27 and 23 to interrupt communication between chambers 28 and 24 and reservoir 16 to thereafter allow the input force to move pistons 26 and 22 and pressurize fluid in chambers 28 and 24 and effect a brake application. On termination of the input force, return springs 66 and 72 move pistons 26 and 22 into the position shown in FIG. 1 wherein fluid communication is again provided between chamber 24 and reservoir 16 via slots 44 in stem 42 of valve 38 located in passageway 32 and between chamber 28 via slots 52 in stem 50 of valve 46, opening 155, groove 157 and out U-shaped openings 127, 127'.

We claim:

1. In a master cylinder for a brake system having a housing with a bore therein connected to a reservoir through first and second ports, first and second pistons located in said bore, a first spring located between said housing and first piston to define a first chamber within said bore, a second spring located in said bore between said first and second pistons to define a second chamber within said bore, said first piston having a first passageway therein for connecting said reservoir to said first chamber, said second piston having a second passageway therein for connecting said reservoir to said second chamber, a first valve located in said first passageway for controlling communication between said reservoir and said first chamber, a second valve located in said second passageway for controlling communication between said reservoir and said second chamber and input means for initially moving said first and second pistons in said bore to allow said first and second valves to simultaneous interrupt communication through said first and second passageways and thereafter develop pressurize fluid in said first and second chambers with further movement of said first and second pistons, the improvement comprising:

- a stud retained in a first groove in said second passageway of said second piston, said stud having a end member with an irregular surface that engages said second piston to prevent said stud from rotating with respect to said second piston;
- a first cylindrical member having a first end and a second end, said first end having a first outwardly projecting flange while said second end has an inwardly projecting flange, said first outwardly projecting flange contacting said first piston;
- a second cylindrical member having a first end and a second end, said second cylindrical member surrounding a portion of said second piston and having a second outwardly projecting flange that engages a shoulder on said second piston, said second cylindrical member engaging said irregular surface on said end member to assure that said end member remains in said first groove in said second piston, said second spring being located between said first and second outwardly projecting flanges; and
- a head member that engages said inwardly projecting flange on said first cylindrical member and mates with said stud for limiting the extension of said second spring to define a maximum distance between said first and second outwardly projecting flanges and correspondingly the maximum size of said second chamber.

2. In the master cylinder as recited in claim 1 wherein said second cylindrical member further includes:

- a plurality of tabs that engage a shoulder on the peripheral surface of said second piston to connect said second cylindrical member with said second piston.

3. In the master cylinder as recited in claim 2 wherein said the engagement of said second cylindrical member with said irregular surface on said end member holds said stud in the axial center of said bore.

4. In the master cylinder as recited in claim 3 wherein said second cylindrical member further includes:

- a plurality of axial projections that extend from said second outwardly projecting flange to assist in retaining a seal in a second groove on the peripheral surface of said second piston.

5. In the master cylinder as recited in claim 4 wherein the engagement of said second cylindrical member with an arcuate segment on said irregular surface of said end member prevents the development of any noise that may occur through independent movement of the stud within said first groove.

6. In the master cylinder as recited in claim 5 wherein said second piston includes;

- a slot that allows a stem of said stud to be positioned in the axial center of said bore.

7. In the master cylinder as recited in claim 6 further including:

- a star washer located in said second passageway which engages said piston to retain a closure spring of said second valve means is said second passageway.

8. In the master cylinder as recited in claim 7 wherein said second cylindrical member includes:

- a plurality of openings through which fluid is communicated from corresponding openings in said second piston connected to said second passageway.

* * * * *